Dec. 3, 1968    W. C. RUDD    3,414,697
TUBE WELDING BY INDUCTION HEATING
Filed Feb. 25, 1965    4 Sheets-Sheet 3

United States Patent Office

3,414,697
Patented Dec. 3, 1968

3,414,697
TUBE WELDING BY INDUCTION HEATING
Wallace C. Rudd, Larchmont, N.Y., assignor to American Machine & Foundry Company, New York, N.Y., a corporation of New Jersey
Filed Feb. 25, 1965, Ser. No. 435,260
11 Claims. (Cl. 219—8.5)

ABSTRACT OF THE DISCLOSURE

An induction coil for high frequency welding of longitudinal seams in tubing is made of separable parts which are clamped together in use. Separation of the parts permits coil replacement and/or side passage of the tubing stock. The coils have one or more turns, continuous internal cooling passages, and may include a nose-like extension which functions through proximity to concentrate current along the converging edges of the tubing.

---

This invention relates to the welding of metal tubing by the use of high frequency heating current inductively applied to the edges of a longitudinal gap in the tubing which edges are to be welded together. The invention is also applicable to cases where instead of welding together longitudinally-extending metal portions along gap edges in tubing, the metal portions may comprise elongated strips or the like, the edges of which are to be welded together.

In many cases it is the practice to accomplish such welding by the use of current conductively applied by contacts engaging the metal along the desired seam line for conducting heating current along the metal edges in advance of the weld point at frequencies of some 100,000 cycles per second or higher. This method of conductively applying the current has the advantage that when the tubing or strip material is to be threaded through the mill prior to starting welding operations, the contacts may be readily elevated out of the way and also they may be displaced or adjusted in position or replaced by others in order better to accommodate tubing of different dimensions or of different metals. While this method permits "threading" of the mill very rapidly and enables convenient starting of operations with a minimum of interference from the contacts, yet under certain circumstances, it is preferable inductively to apply the high frequency current instead of doing so conductively by contacts.

For inductively applying the current according to one method which has often been proposed, an elongated inductor coil having one or more turns is mounted to extend along the desired seam line to induce current flowing in paths along the edges of the metal at opposite sides of said line without having the coil extending circumferentially around the tubing, thereby avoiding unnecessary heating of the tube metal around the back side opposite from the desired seam line. While coils of this type may readily be displaced to permit rapid "threading" of the mill, yet, with such elongated coils, the current paths in the tube metal are such that the results are relatively inefficient. Also the paths of induced current in the tube metal, and which extend along the edges to be heated, must reverse direction and extend back without any opportunity of the current to flow entirely to the weld point and back again from the region of the forward end of the elongated coil, which forward end cannot extend to the weld point without interference with the pressure rollers at that region. Thus the heat along the seam line will either have an opportunity to be distributed away from the seam line, allowing excessive cooling before the weld point is reached, or else the metal will have to be overheated beneath the inductor coil and thus unduly softened, preventing the formation of a good forged-type weld under pressure at the weld point. For these reasons it has come to be appreciated that, in lieu of using elongated inductor coils extending along the seam line, it is preferable to use coils of one or more turns, which extend circumferentially around the tubing or metal workpieces at a position in advance of the weld point. Then the path of induced current on the tube metal will extend from a point on one of the gap edges circumferentially around the tubing to an opposite point on the other gap edge, thence along that gap edge entirely to the weld point and finally back on the first gap edge to the starting point. With such a circumferentially-extending coil, in view of the presence of the tube gap, the path of the induced current will thus be compelled to follow along the gap edges from the region of the coil to and from the weld point and causing heating of the edges to the desired welding temperature, that is, the maximum temperature at or closely adjacent the weld point, which is the only point where the metal surfaces should be heated to welding temperature to insure that the metal in back of the edge surfaces remains firm, permitting the edges to be forcefully pressed together to form a good forged weld. However, the use of such circumferentially-extending inductors presents a serious disadvantage when the mill is being initially threaded with the workpiece or pieces in the form of elongated tubular metal or strips. Usually for high efficiency as an inductor, the inner surfaces of the induction coil should have a very close clearance with respect to the periphery of the tubing or other workpieces being passed through the mill, viz a clearance such as in the neighborhood of 0.060 to ¼ of an inch. Such a narrow clearance renders it a very difficult operation to thread the mill without damaging the coil, especially since the leading end of the tubing or strip as it enters the mill, and also the trailing ends thereof, usually have irregularities in their dimensions. Furthermore, such circumferentially-extending induction coils must not only surround the tubing or workpieces being threaded therethrough in starting up operations, but also in many cases provision must be made for a mandrel to extend down into and forwardly within the tubing when in position, such mandrel being used to support a so-called "impeder" to improve the efficiency of the high frequency heating operation in the region of the weld point, or such a mandrel may be necessary to carry a scarfing tool for extending far enough into the tubing to scarf away the irregular metal formations extruded inwardly of the tubing along the seam line. After the tubing or workpieces to be welded have have been run through and out of the mill, such a mandrel is left in place and it is normally impossible to remove an induction heating coil encircling same without first removing the mandrel. In other words, with the coil surrounding the workpiece strip or strips as well as the mandrel or other impeder and scarfing supporting means, the coil cannot be removed or replaced until all of these items surrounded thereby are removed. For example, if in operation the induction coil is damaged, it is necessary to remove the mandrel and other equipment in order to replace the coil.

In accordance with the present invention, an induction heating coil construction and arrangement is provided, which will alleviate all of these problems so as to make it possible readily to remove or displace the coil structure for any purpose, or to thread the mill without interference with any of the other parts of the mill, and this may be accomplished very rapidly without liability of damaging the coil. This is made possible, in accordance with the invention, by so constructing and supporting the coil that a considerable circumferentially-extending portion thereof may readily be removed, including the necessary cooling fluid passages therein, whereby the remainder of the coil, if desired, may also be moved transversely out of the way. In effect an induction heating coil, which may have one or more turns, is provided of a split type, with relatively simple supporting and clamping devices being provided for holding the two halves or portions thereof together, while still permitting same easily to be separated and removed out of the way and later replaced.

Various further and more specific objects, features and advantages of the invention will appear from the description given below, taken in connection with the accompanying drawings, illustrating by way of example preferred forms of the invention.

FIGS. 3a, 3b, 3c and 3d respectively are enlarged transverse sectional views showing the several forms of seams which may be welded with the apparatus.

Figure 2:
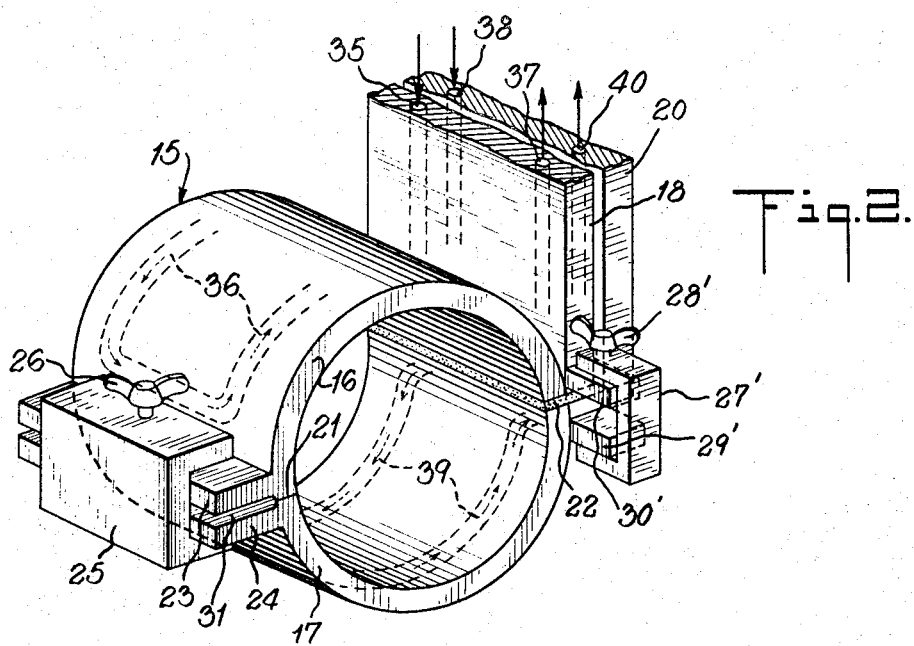
FIG. 2 is a perspective view of the induction coil portion of the example of FIG. 1 and as viewed in the opposite direction as compared with FIG. 1, this view also showing in dotted lines one possible arrangement of the fluid cooling cavities for the structure.
Figure 4:
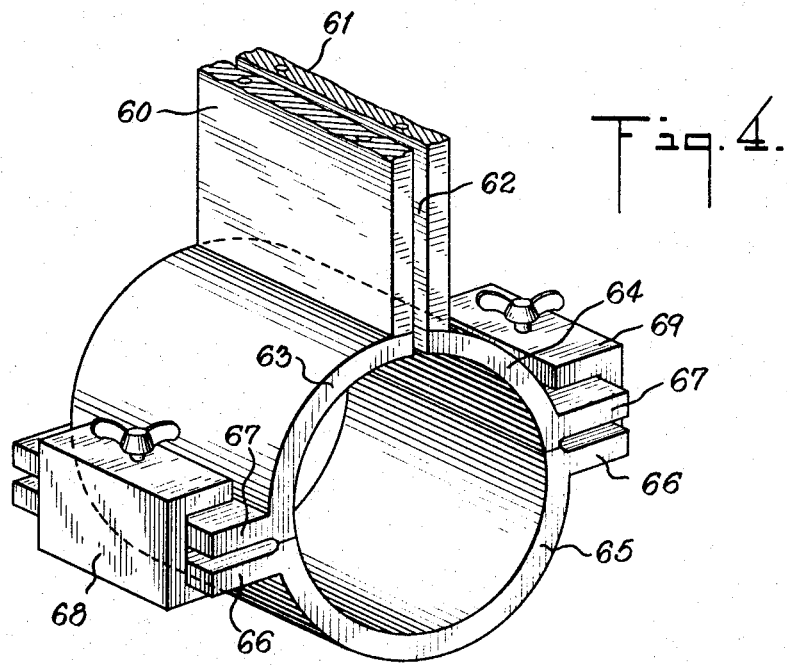

FIG. 4 is a view of an alternative embodiment of the inductor coil arrangement similar to that of FIG. 2, but showing the current-connecting and supporting leads extending from the upper portions of the structure instead of from the side as in FIG. 2.

Figure 5:
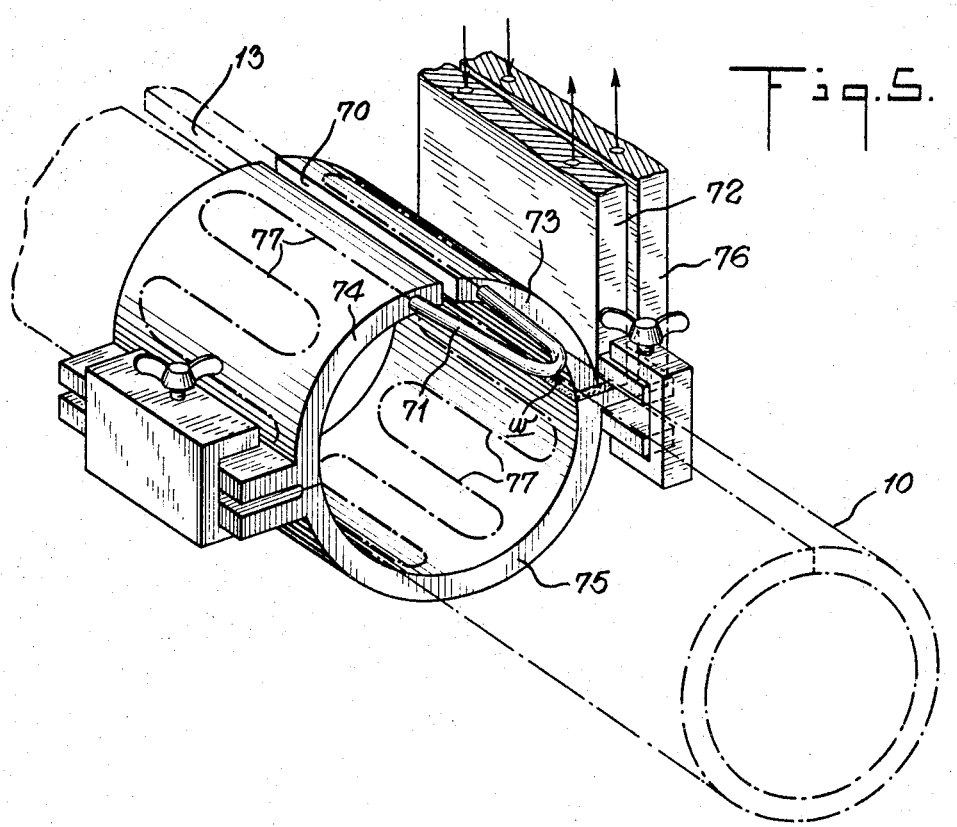

FIG. 5 is a view similar to FIG. 2, but illustrating the structure when provided with a so-called "nose coil," as will be hereinafter explained.

FIGS. 6 to 9 inclusive are perspective views of alternative embodiments of the induction coil structure in forms having a plurality of "turns." For example, as specifically here shown, two turns are shown to encircle the workpiece as it advances therethrough.

Figure 1:
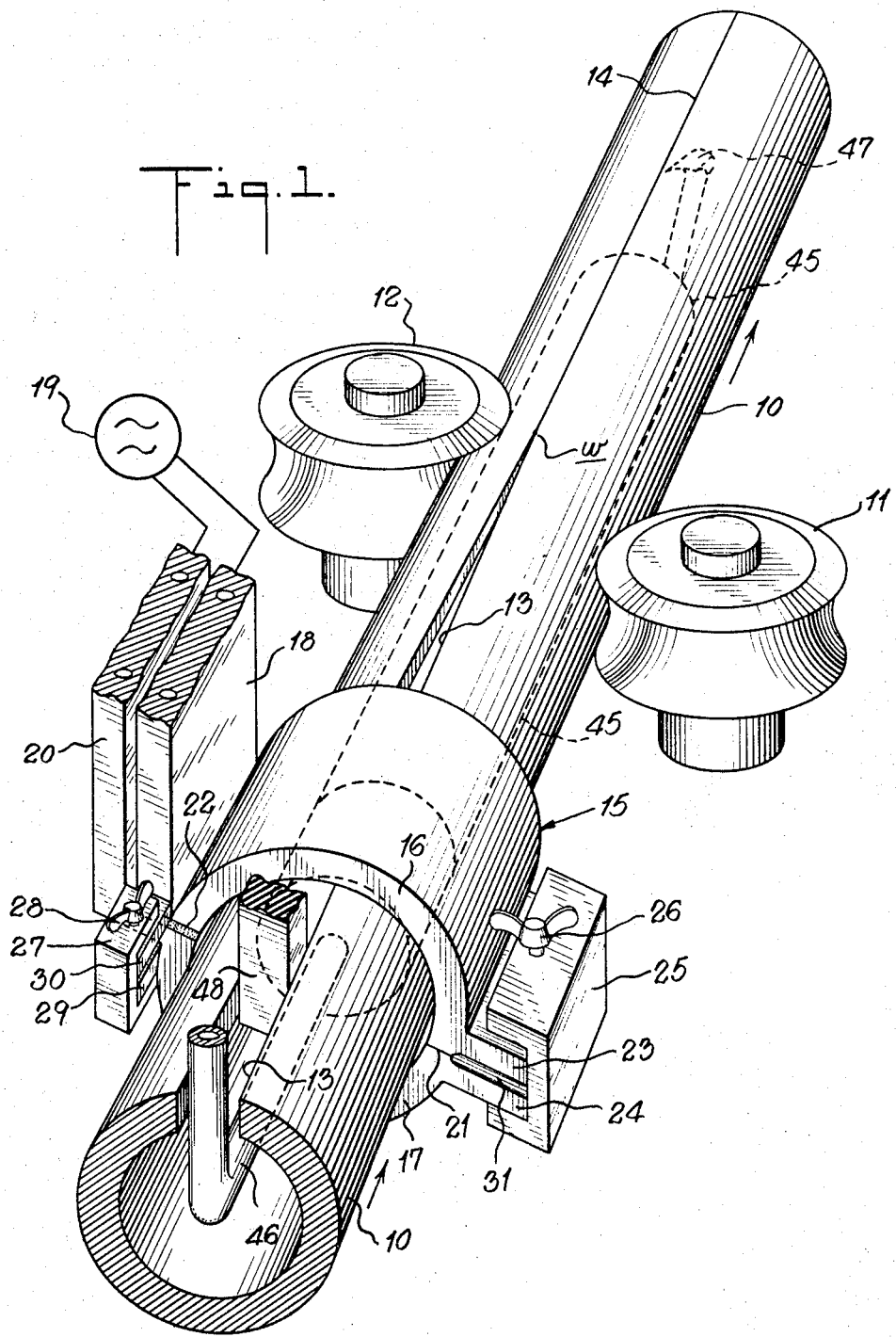
FIG. 1 is a somewhat schematic perspective view of the apparatus of one embodiment of the invention. In the interests of clearness, the parts are not necessarily here shown with their preferred relative dimensions.

Referring now to FIG. 1 in further detail, a tube 10 is being advanced in the direction indicated by the arrow through a tube mill by and between a pair of pressure rollers of known form, as at 11, 12, which engage opposite sides of the tube and cause a longitudinally-extending V-shaped gap 13 therein to become closed substantially at a welding point indicated at w. It will be understood that other rollers, some of which may be power driven and orders idler rollers, may be used both prior to and subsequent to the parts shown in FIG. 1, for taking a strip of metal skelp or the like and forming same to tubular shape with the longitudinal V-shaped gap and advancing same to the equipment as shown in FIG. 1, in which the edges at the gap become welded together along a seam line, as indicated at 14, the welded tubing being carried on further by subsequent rollers.

An induction heating coil 15 is here shown having one "turn," divided into upper and lower half portions 16 and 17, these portions being semi-circular in cross-section in the event the workpiece 10 is in the form of tubing of circular cross-section, but if the workpiece is to be of other forms of cross-sections, then, of course, the coil portions 16, 17 will be correspondingly shaped, and in any case, so that the inner surfaces of the coil portions will have a rather close clearance spacing with respect to the work, for example in the neighborhood of ⅛ inch or less.

The coil portion 16 may be attached to or integrally formed with a terminal or lead portion 18 for conducting current to the coil from a high frequency source, schematically shown at 19. The other coil portion 17 is connected to, or integrally formed with, a lead portion 20 for conducting current from the other terminal of the high frequency source, to the coil portion 17, so that a circuit is provided from terminal lead 18 around coil portion 16, thence through the surfaces thereof, at 21, which abut adjacent surfaces on the portion 17 on which the current is conducted around the lower side of the coil and back to the terminal 20. Adjacent the lower portions of the lead portions 18 and 20, the coil portions may be maintained in spaced relation as by suitable insulating means interposed between the edges thereof, as indicated at 22.

At each side of the abutting surfaces at 21, the coil portions 16 and 17 respectively are provided with protruding lug portions 23 and 24, which may be clamped with respect to each other as by a clamping means 25 and which may be tightened as by thumb-screw means 26, or otherwise, so that pressure forcing the two lug portions toward each other insures that the abutting edges 21 on the coil portions are retained in firm and good contacting relation, insuring that the circuit for the high frequency current will flow therethrough rather than into or about the lug portions. The clamping means 25 preferably should be either insulated or formed of insulating material, for example such as suitable well known heat-resistant compositions of phenol formaldehyde and mica, or the like.

At the opposite side of the coil structure, somewhat similar insulation clamping means, as at 27, 28, may be provided, to engage a lug as at 29, protruding from an edge of coil portion 17, and a lug 30 similarly protruding from an edge of the terminal lead 18, whereby the clamping means will securely hold the adjacent portions of the coil structure together.

As shown in both FIGS. 1 and 2, the opposed surfaces of the lug portions 23 and 24 are preferably somewhat spaced apart, as by a gap 31, so that the lug portions may be pressed toward each other by the clamping means, more or less resiliently without touching, while causing the adjacent coil edges to be pressed firmly together for conducting the current from one coil portion to the other.

As further shown in FIG. 2, the edges of the terminal leads 18 and 19 opposite from those shown in FIG. 1, may be accompanied by clamping means as at 27' engaging lugs 29' and 30' corresponding to lugs 29 and 30 above referred to. Thus when the clamps 25, 27 and 27' are all secured in position, the induction coil structurally will form a rigid single-turn coil assembly, and as such it may be essentially mounted and supported by the rigid terminal lead members 18 and 20 or otherwise. On the other hand, when these clamps are removed, it will be apparent that the lower coil section 17 will be free for removal from the assembly, thus giving ready access to the path through which the workpiece must be led when threading same through the tube mill prior to starting operations. Furthermore, if desired, the terminal lead 18, which will remain as a support for the upper coil portion 16, may be mounted on any suitable structure so that it may be either elevated or removed, thereby to remove the upper coil portion 16, or permitting it to be elevated out of the way of any workpiece being threaded through, or removed from, the mill.

Such induction heating coils are adapted to be supplied with high frequency current preferably of a frequency of at least 10,000 cycles per second, but preferably higher, such as 50,000 or 100,000 cycles per second or even higher, and the coil structure should be designed in such manner as to conduct heavy amounts of power. Consequently, as is common with induction heating coils, the structure must be formed with suitable cooling fluid cavities. With the example shown in FIG. 2, cooling fluid, for example, may be introduced to flow downwardly in the terminal 18 through a cavity 35, thence through cavities, as indicated by dotted lines 36, extending around within the body of the coil portion 16 and back to a discharge cavity 37 extending up through the lead 18. Similarly, for cooling the lead 20 and the lower coil portion 17, cooling fluid may be introduced through a cavity 38 extending down through the lead 20 and connecting with a cavity indicated by dotted lines 39 extending around within the body of coil portion 17 and back to an outlet cavity 40 in the lead 20. Of course, other arrangements of the cooling fluid cavities may be suitable and advisable, for example, cavity portions may, if desired, extend through the parting line portions 21 and 22 of the two halves of the coil (as per examples described below), so that the fluid may circulate first through one coil portion and then through the other to and from the lead portions 18 and 20.

Referring further to FIG. 1, there is indicated by dotted lines at 45 a so-called "impeder" mounted as on a mandrel 46 having a supporting portion, as indicated, extending down through the tube gap 13 and then forwardly. Such impeders may be of a suitable known construction formed of magnetic material of an insulating nature, to provide a core substantially free of eddy current losses, but having substantial permeability, such a core being effective to improve the efficiency of the induction heating coil by increasing the impedance of the high frequency current paths around the back sides of the tubing being welded and opposite from the gap 13, where the edge surfaces are to be heated up to welding temperature upon reaching the weld point w. The impeder 45 may preferably extend along within the tubular workpiece 10, as far as, and possibly beyond, the region of the weld point w.

In many cases it may be desired to cut away such metal or material as may be extruded inwardly of the tubing (during the welding) from the seam line, and for this purpose a suitable scarfing tool, as at 47, may be mounted on the forward end of the same mandrel means which carries the impeder 45 (if an impeder is used).

At some suitable point in advance of the induction heating coil, the spacing of the edges of the tube gap 13 may be controlled by a seam-guide means, as at 48, formed of suitable insulating material protruding down into the gap so that the feed rolls in advance of that position (not shown) will cause the tube gap edges to be pressed against the opposite sides of this seam guide, whereby the edges will be maintained with a uniform separation.

It will be apparent that if the induction coil 15 were formed as a single unitary member substantially encircling the path of the tubing, then it would be a quite difficult task to initially thread the forward end of the tubing into the mill before starting operations, because of the close clearances between the outer surface of the tube metal, and the inner surfaces of the coil, the problem being made greater by reason of the fact that the tube metal will surround the impeder 45 with relatively close clearances. Yet, by providing the coil in the form of two separable halves, this problem is greatly minimized in that the tubing or other workpiece may be initially put into place to extend through and beyond the region of the weld point before the coil parts are put into place, and the coil parts may be readily applied thereafter and each adjusted properly to have the appropriate clearance with respect to the tube metal. Also, in any case where the coil parts may be damaged during operations, either one or both of the tube coil portions may be readily taken off and replaced without disturbing any of the other parts of the assembly, while, if the coil were of a single integral piece, it could not be readily removed without first going through the quite troublesome and time-consuming operations of removing the workpiece or pieces, as well as the mandrel and other parts supported thereby.

Figure 3A:
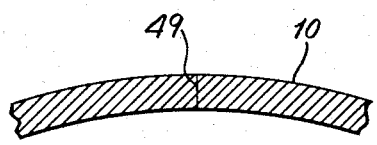
Figure 3C:
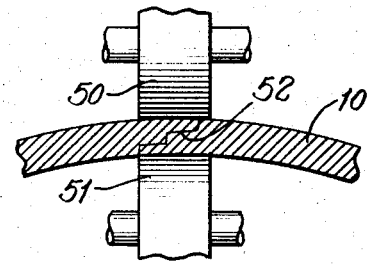
Figure 3B:
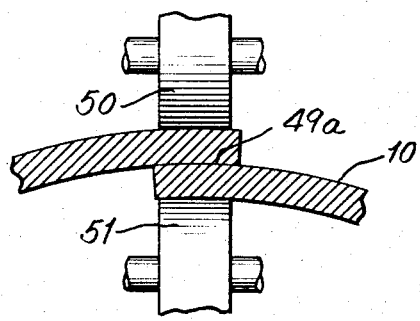
Figure 3D:
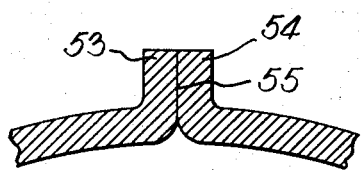

With induction heating coils such as above referred to, the welded seam may take various forms. For example, as shown in FIG. 3a, it may be a simple butt-welded seam 49; or, as shown in FIG. 3b, the tube gap edges may be so brought together as to be in overlapping relation at the weld point to form a lapped seam 49a. In that event, rollers, as at 50, 51, above and below the lapped seam may be provided to force the portions to be welded into good forge-welded relation. In this case, it will be apparent that the roller 51 will have to be supported internally of the tubing 10, and for that purpose a mandrel may be provided extending back and thence up out through the tube gap in a manner similar to the mandrel 46 in FIG. 1. When such a mandrel is used to support an internal roll, the use of the split type of coil, in accordance with the invention, is particularly advantageous, as such a coil may be put in place or removed or replaced, while the internal roller 51 and its supporting mandrel remain undisturbed. As indicated in FIG. 3c, the welded seam may take the form of a seam diagonal in cross-section, as indicated at 52, either conforming to a straight diagonal line, or a stepped line, as shown. Also, in such cases the seam may be of the mash-lapped form. With these formations, the pressure 50 and 51 will ordinarily be necessary, with the roller 51 mounted internally of the tubing. As shown in FIG. 3d, the tube gap edges may be formed with upturned flanges, such as at 53, 54, so that they will be brought together to provide a vertically-extending welded seam 55. The parts forming this seam may be brought together under pressure by the side pressure rollers, such as at 11, 12 in FIG. 1.

With the embodiment of the invention shown in FIG. 4, terminal supporting leads for the induction heating coil are shown as at 60, 61, extending vertically from the upper portions of the coil and with a suitable gap 62 including insulation means, if desired, therebetween. The lead 60 may be integrally formed with, and act as a support for, a coil portion 63, whereas the lead 61 may similarly be associated with a coil portion 64, the coil portions 63 and 64 being separated by the gap 62. These portions, generally with a lower coil portion 65, will serve to complete the one-turn coil. The portion 65 may be constructed like the portion 17, above referred to in connection with FIGS. 1 and 2, and it and the other coil portions may be formed with lugs, as at 66 and 67, accompanied by insulation clamp means, as at 68, 69, all like or similar to the lug and clamp means shown at the left hand side of FIG. 2. Usually, however, it will be preferred to have the terminal leads or supports connected to a side of the coil, as in FIG. 2, instead of the top, as this will leave the tube gap and the welded region more fully exposed to the view of the operator of the mill. However, the form shown in FIG. 4 provides a ready means for forming a coil of three sections instead of two, which may be preferred under some circumstances.

The form of coil shown in FIG. 5 is similar to that shown in FIG. 2, and its terminal and supporting structure and clamping means may be the same, but here, at the upper side of the coil turn, a gap 70 is formed therethrough, and, at the forward edge of the coil, a so-called "nose coil" portion 71 is provided, bridging the gap. This may be of a U shape, adapted to extend out and to the opposite sides over the V-shaped gap 13 in the tubing, and if desired, to a position above the weld point w. With this arrangement, the high frequency current will be carried from the supporting lead 72, over a coil portion 73, along on the nose portion 71, thence onto a coil portion 74 and by way of a coil portion 75 back around to the other terminal lead 76.

Due to the so-called "proximity effect," the current as carried out over the edges of the V-shaped gap by the nose coil portion 71, will, under certain circumstances, facilitate a desirable and improved concentration of the current along on the surfaces of the gap edges.

FIG. 5 also shows in dot-dash lines, as at 77, an alternative type of path for the cooling fluid cavities within the coil portions. That is, the path may extend sinuously through coil portion 73, thence through the hollow "nose coil" 71, to the sinuously-extending cavities 77 in the coil portions 74 and 75.

Figure 6:
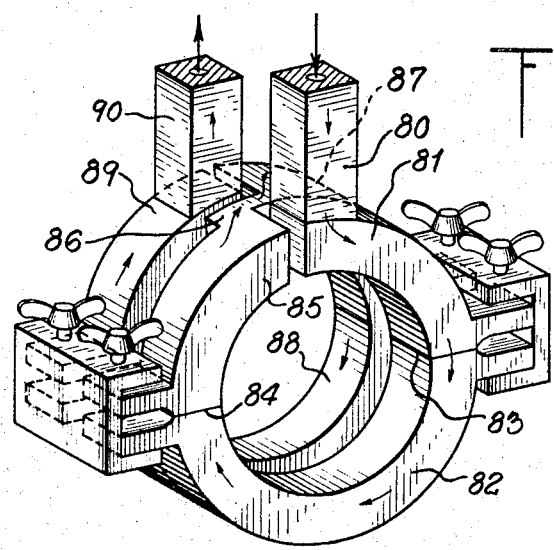

With the two-turn form of coil structure shown in FIG. 6, one of the terminal leads 80 may be attached to a coil portion 81 which extends for 90° around the workpiece and abuts the end of a semicircular coil portion 82 at a parting line 83, and the other side of coil portion 82 abuts at a parting line 84 another 90° coil portion 85. This latter portion has an angularly-shaped extension 86 integrally formed with another 90° coil portion shown in dotted lines at 87, comprising a part of the second turn of the coil. This second turn has a lower semicircular portion 88 and another 90° extending portion 89 secured to or supported by the other terminal lead 90. It will be apparent that the upper halves of both coil turns may be readily separated from the lower halves thereof along a horizontal plane extending along the parting lines 83 and 84, and the upper and lower coil portions may be formed with lugs and removable clamping means as shown, and like those above described in connection with FIGS. 1 and 2. The several arrows in FIG. 6 indicate the path portions along which the cooling fluid cavities may extend within the several portions of the structure, and these arrows also indicate the general path which the high frequency current may follow from terminal lead 80 along over the two turns of the coil to the terminal lead 90.

Figure 7:
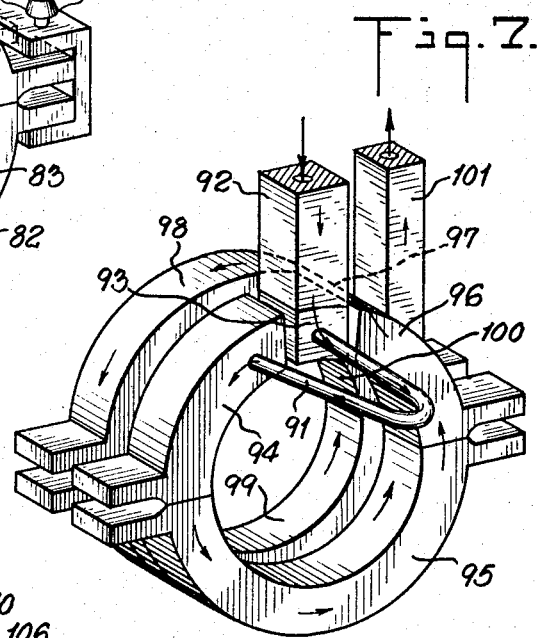

FIG. 7 is generally similar to FIG. 6, except that here a "nose coil" portion 91 is provided for the same general purpose as the nose coil 71 in FIG. 5. Here the terminal lead 92 may carry on its lower end a small coil portion 93 to which is joined one arm of the nose coil 91, the other arm of which is joined to a coil portion 94. The current path continues along a lower coil portion 95, thence to a portion 96 connected by an angularly-shaped portion, shown in dotted lines at 97, to an upper coil portion 98 forming part of the second turn of the coil. The lower part of this second turn is indicated at 99. Finally, the second turn includes a portion 100, connected to the other terminal lead 101.

Figure 8:
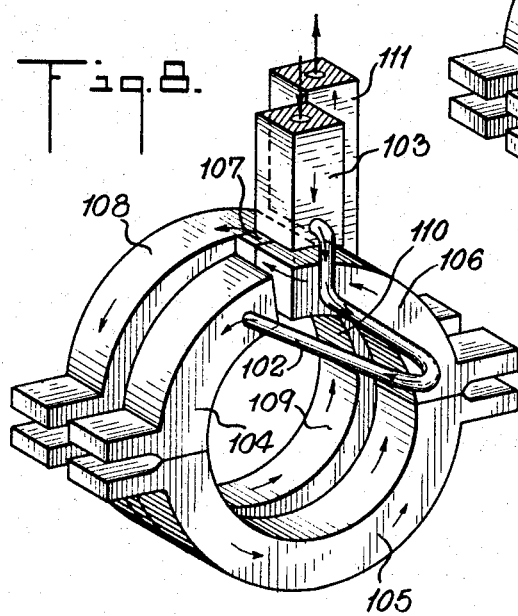

FIG. 8 shows another way in which a nose coil portion 102 may be used in connection with a two-turn coil. Here the terminal lead 103 terminates above the main first turn of the coil, but is connected to the nose coil portion 102, the other arm of the latter continuing the circuit in succession through coil portions 104, 105, 106, 107, 108, 109 and 110 to the other terminal lead 111.

Figure 9:
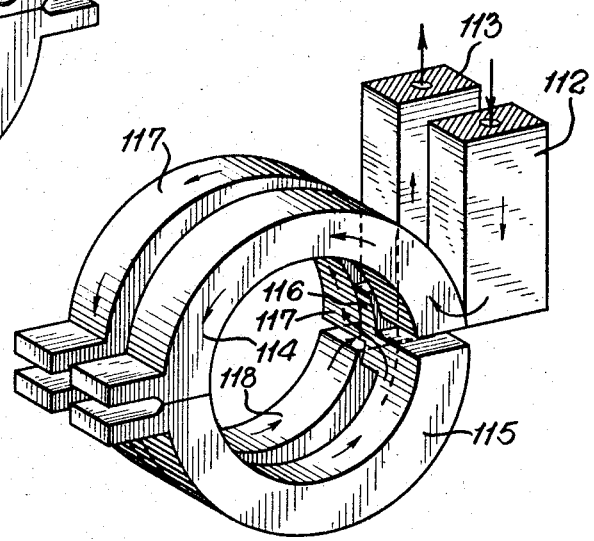

FIG. 9 illustrates the way in which the terminal leads, as at 112, 113, may be mounted at the sides of a two-turn type coil, the current path from terminal 112 following in succession coil parts 114, 115, 116, 117 and 118, the latter being connected to the other terminal lead 113.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together the opposed edges of a longitudinal gap in metal tubing which comprises: means for rapidly and longitudinally advancing the tubing while applying transverse pressure to bring such edges together substantially at a welding point in a narrow V-shaped formation with its apex at said point; an induction heating coil structure for surrounding said tubing during welding with its axis substantially coinciding with the axis of the tubing and with close clearance relative thereto at a region slightly in advance of said point; a source of high frequency current for energizing said coil structure to cause high frequency current to be induced to flow in said tubing from the region of said coil structure along the edges of said gap to and from the weld point for heating such edges to welding temperature; said coil structure consisting of at least two turns in series formed from at least two parts separable along lines extending in a direction longitudinally of the coil structure permitting disassembly of the coil structure in a manner admitting of side passage of the tubing relative thereto; terminal leads secured respectively to separate parts of said coil structure at opposite electrical ends of said coil for supplying said current thereto, said leads being connected to said current source; and releasable clamping means for clamping said coil parts with respect to each other in their respective operative positions.

2. Apparatus in accordance with claim 1, wherein said coil structure is formed with a gap therein which extends longitudinally thereof in apposition to the location of the tubing gap during welding, said gap being bridged by a generally U-shaped hollow conductor projecting longitudinally from said coil with its bight towards the welding point and its legs disposed to overlie in close proximity the opposing edges of a portion of said V-shaped formation for concentrating therein the current flowing along said edges.

3. Apparatus in accordance with claim 1, wherein all of said coil parts and terminal leads are provided with cooling fluid cavities which, when the coil parts are clamped together in operative position, interconnect to provide a continuous passage for the flow of cooling fluid through the coil parts.

4. Apparatus in accordance with claim 1, wherein, for a two-turn coil, the parts are separable along parting lines lying in a plane passing through the coil axis, the coil parts on one side of said plane are generally semicircular, each forming a part of one turn, and the coil parts on the other side of said plane include one which forms a part of one turn and a part of another turn interconnected thereto by an angular formation, two other turn parts being provided to complete the respective turns.

5. Apparatus in accordance with claim 4, wherein the coil parts on said other side of the plane include a nose-like portion extending forwardly of the coil structure over the region of the tube gap during welding.

6. Apparatus in accordance with claim 1, wherein the electrical ends of said coil are located along one side of the coil, each turn of the coil is separable along a parting line on the other side of the coil, and the internal end of one turn is provided with an angularly disposed portion which contacts the internal end of the other turn.

7. Apparatus for welding together the opposed edges of a longitudinal gap in metal tubing which comprises: means for rapidly and longitudinally advancing the tubing while applying transverse pressure to bring such edges together substantially at a welding point in a narrow V-shaped formation with its apex at said point; an induction heating coil structure for surrounding said tubing during welding with its axis substantially coinciding with the axis of the tubing and with close clearance relative thereto at a region slightly in advance of said point; a source of high frequency current for energizing said coil structure to cause high frequency current to be induced to flow in said tubing from the region of said coil structure along the edges of said gap to and from the weld point for heating such edges to welding temperature; said coil structure having at least one circumferential portion removable from the remainder of the coil structure along two circumferentially spaced parting lines extending in a direction longitudinally of the coil structure permitting disassembly of the coil structure; said coil structure when assembled having a gap therein extending longitudinally thereof; terminal leads for supplying said current to said coil structure on opposite sides of said gap, said leads being connected to said current source; and a plurality of releasable clamping means for clamping said removable coil portion in operative position relative to the remainder of said coil structure establishing electrical contact with said removable portion along both parting lines.

8. Apparatus according to claim 7, wherein one of said parting lines is located between said removable portion and one of said leads adjacent said gap, and one of said clamping means when the coil structure is assembled clamps the free end of said one lead in electrically conductive relation to one side of said removable portion.

9. Apparatus according to claim 8, wherein the remainder of said coil structure is secured to said other lead and supported thereby, said other lead being movably mounted for moving the remaining coil structure away from the path of travel of the metal tubing when the removable portion is separated therefrom.

10. Apparatus in accordance with claim 7, wherein all of said coil structure and terminal leads are provided with cooling fluid cavities which, when the coil structure is clamped together in operative position, interconnect to provide a continuous passage for the flow of cooling fluid therethrough.

11. Apparatus for welding together the opposed edges of a longitudinal gap in metal tubing which comprises: means for rapidly and longitudinally advancing the tubing while applying transverse pressure to bring such edges together substantially at a welding point in a narrow V-shaped formation with its apex at said point; an induction heating coil structure for surrounding said tubing during welding with its axis substantially coinciding with the axis of the tubing and with close clearance relative thereto at a region slightly in advance of said point; a source of high frequency current for energizing said coil structure to cause high frequency current to be induced to flow in said tubing from the region of said coil structure along the edges of said gap to and from the weld point for heating such edges to welding temperature; said coil structure consisting of at least two turns in series formed from at least two parts separable along a plane passing through the coil axis permitting disassembly of the coil structure in a manner admitting of side passage of the tubing relative thereto; said coil structure having a gap therein extending longitudinally thereof in apposition to the location of the tubing gap during welding; said coil structure being provided with conductive portions projecting longitudinally from said coil on both sides of said coil gap towards the welding point to overlie in close proximity the opposing edges of a portion of said V-shaped formation for concentrating therein the current flowing along said edges; terminal leads secured respectively to separate parts of said coil structure at opposite electrical ends of said coil for supplying said current thereto, said leads being connected to said current source; and releasable clamping means for clamping said coil parts with respect to each other in their respective operative positions.

References Cited
UNITED STATES PATENTS

| | | | |
|---|---|---|---|
| 2,404,987 | 7/1946 | Rudd | 219—10.79 X |
| 3,015,017 | 12/1961 | Rudd | 219—67 X |
| 3,031,554 | 4/1962 | Jackson | 219—8.5 X |
| 3,037,105 | 5/1962 | Kohler | 219—8.5 |
| 3,242,299 | 3/1966 | Laughlin et al. | 219—8.5 |
| 3,242,301 | 3/1966 | Osborn | 219—8.5 |

RICHARD M. WOOD, *Primary Examiner.*

B. A. STEIN, *Assistant Examiner.*